United States Patent [19]

Chang

[11] Patent Number: 4,572,121
[45] Date of Patent: Feb. 25, 1986

[54] ROTARY VANE TYPE I.C. ENGINE WITH BUILT-IN SCAVENGING AIR BLOWER

[75] Inventor: Victor Chang, Panameric, Venezuela

[73] Assignee: Instituto Venezolano de Investigaciones Cientificas (I.V.I.C.), Caracas, Venezuela

[21] Appl. No.: 431,734

[22] Filed: Sep. 29, 1982

[51] Int. Cl.$^4$ ............................................. F02B 53/08
[52] U.S. Cl. ...................................... 123/203; 123/236
[58] Field of Search ............... 123/203, 212, 221, 234, 123/236, 69 R, 204, 243

[56] References Cited

U.S. PATENT DOCUMENTS

| | | | |
|---|---|---|---|
| 1,004,696 | 10/1911 | Schoeck | 123/203 |
| 1,427,692 | 8/1922 | Mahon et al. | 123/203 |
| 1,970,004 | 8/1934 | Friedell | 123/203 |
| 2,114,674 | 4/1938 | Buckbee | 123/236 |
| 2,246,235 | 6/1941 | Beach | 123/203 |
| 2,284,184 | 5/1942 | Warner | 123/234 |
| 3,437,079 | 4/1969 | Odawara | 123/243 |
| 3,546,878 | 12/1970 | Yoshimura | 123/203 |
| 3,693,601 | 9/1972 | Sauder | 123/203 |
| 3,723,033 | 3/1973 | Tauscher | 123/203 |
| 3,858,559 | 1/1975 | Thomas, Jr. | 123/203 |
| 4,241,713 | 12/1980 | Crutchfield | 123/203 |

FOREIGN PATENT DOCUMENTS

| | | | |
|---|---|---|---|
| 656229 | 2/1938 | Fed. Rep. of Germany | 123/243 |
| 2307465 | 8/1973 | Fed. Rep. of Germany | 123/236 |
| 1115332 | 12/1955 | France | 123/236 |
| 783913 | 10/1957 | United Kingdom | 123/236 |

Primary Examiner—Michael Koczo
Attorney, Agent, or Firm—Browdy and Neimark

[57] ABSTRACT

A rotary internal combustion engine consisting of a generally cylindrical housing assembly having three different sections, with a common power shaft eccentrically journalled in the assembly. Each section has a rotor mounted on the power shaft, with six evenly spaced radial vanes slidably carried thereby and being slidably and sealingly engageable with the inside surfaces of the associated section. A fuel intake duct is connected to the first section, which accomplishes fuel admission and compression strokes. A port in a partition wall admits compressed fuel into the second section, which has spark plugs for igniting the compressed fuel. The second section provides expansion and exhaust strokes. The gaseous products of combustion leave through an exhaust duct connected to the second section. The third section defines an air blower whose output is connected to the second section by a transfer duct, discharging into the exhaust region of the second section and exerting scavenging action on the gaseous products of combustion discharging through the exhaust duct. Thus, there are six power strokes per revolution of the power shaft.

12 Claims, 7 Drawing Figures

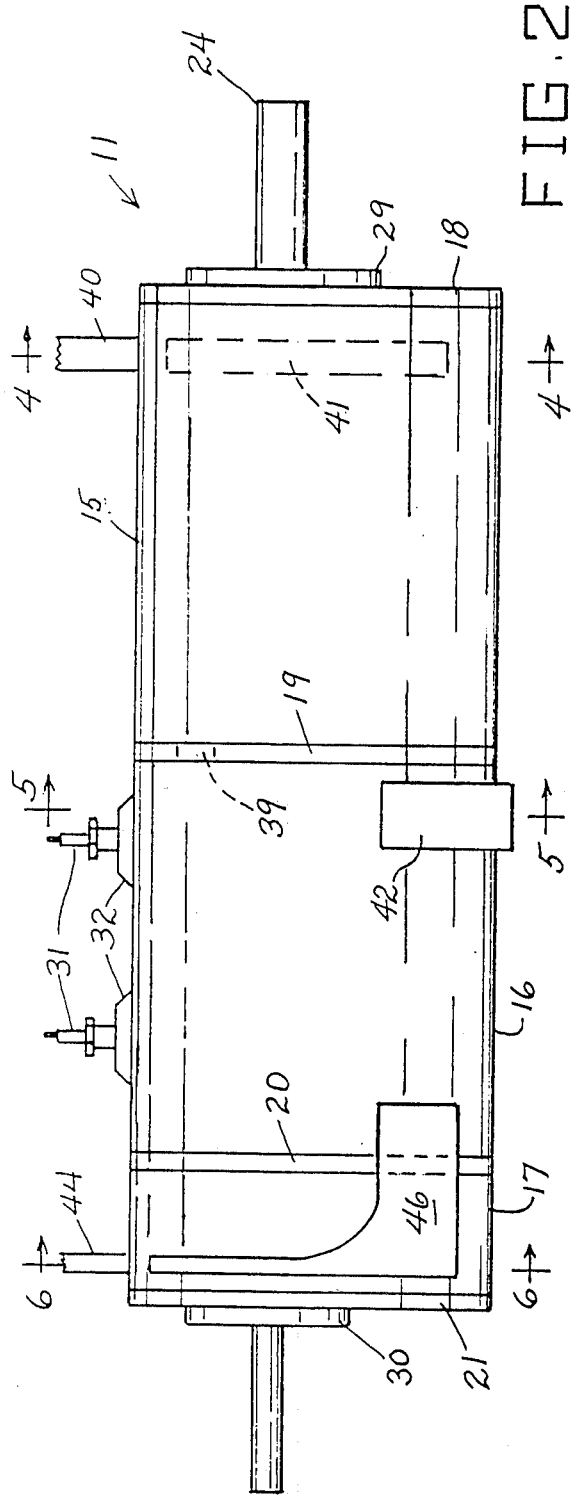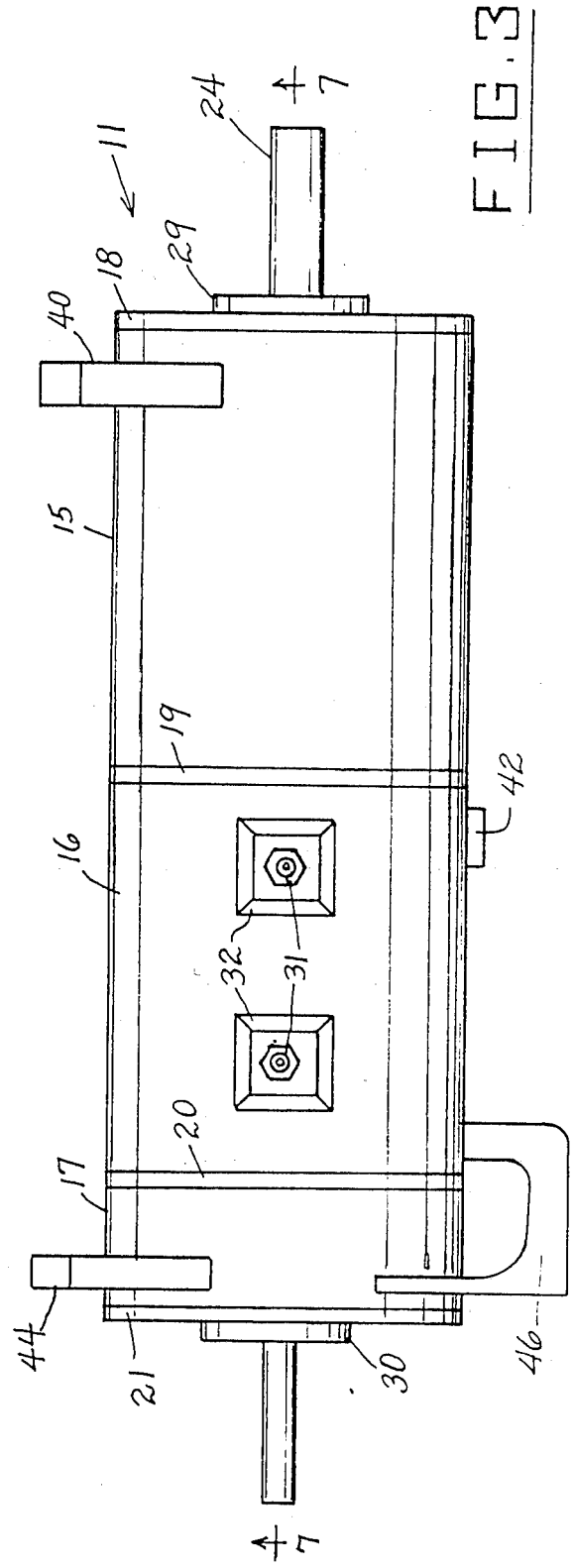

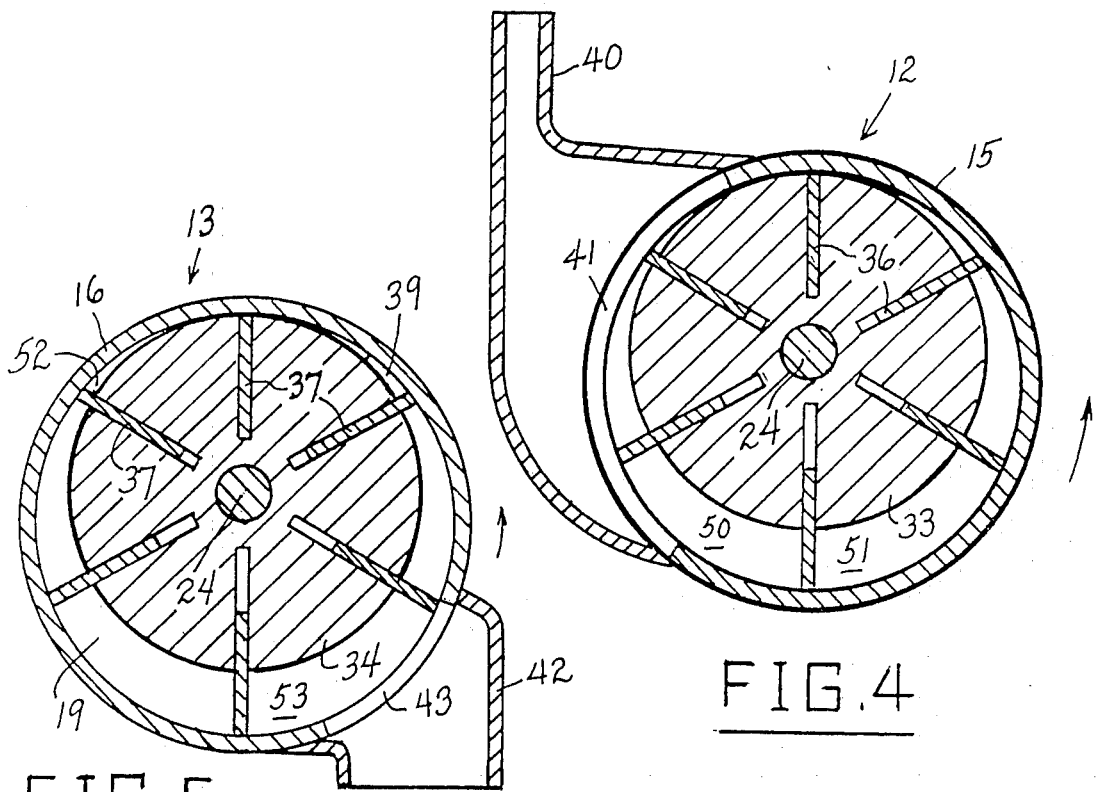
FIG.4
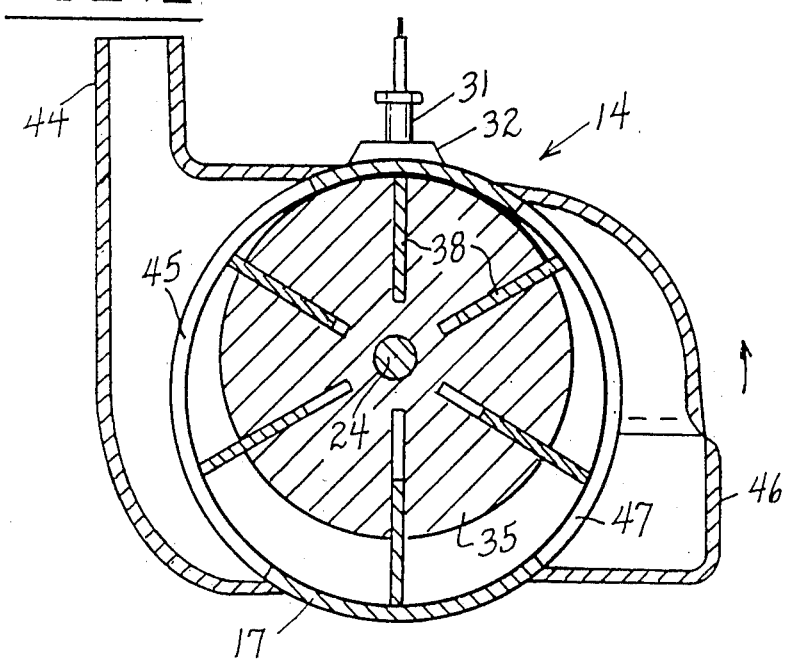
FIG.5
FIG.6

ROTARY VANE TYPE I.C. ENGINE WITH BUILT-IN SCAVENGING AIR BLOWER

FIELD OF THE INVENTION

This invention relates to internal combustion engines, and more particularly to valveless engines based on the Otto cycle which employ eccentrically-mounted rotors equipped with radial slidably projecting working vanes operating in cylindrical cavities.

BACKGROUND OF THE INVENTION

Conventional internal combustion engines usually employ cam-operated valves driven from a camshaft, synchronization gears, chains, connecting rods and numerous other moving parts, including reciprocating pistons, all of which produce a substantial amount of vibration, wear and energy loss. In order to reduce or eliminate such undesirable factors, various types of rotary engines have been proposed, which use rotors having radial vanes cooperating with the inside surface of a cylindrical chamber or stator in which said rotors are eccentrically mounted. Typical examples of such previously proposed rotary engines are shown in U.S. Pat. No. 1,427,692 to T. C. Mahon et al, and U.S. Pat. No. 3,437,079 to D. Odawara. Such prior rotary engines suffer from deteriorating gas-tightness between the rotors and the walls of the stators due to rapid wear, inefficient cooling of the engine, lack of provision for effective air scavenging of the combustion space, unreliable fuel intake, noisy operation, excessive fuel consumption, large bulk and weight, and high cost of manufacture. Thus, there is a definite need for improvements with respect to these features, as well as for general simplification in construction.

SUMMARY OF THE INVENTION

A main object of the invention is to provide an improved rotary internal combustion engine which substantially overcomes the disadvantages and deficiencies of the previously proposed engines.

A further object of the invention is to provide an improved rotary internal combustion engine based on the Otto cycle mode of operation.

A still further object of the invention is to provide an improved rotary internal combustion engine including a plurality of eccentrically-mounted rotors rotatably mounted on a common axle, the rotors being equipped with radially projecting slidable vanes operating in individual cylindrical stators defining respective stages receiving the rotors therein, including a first stage accomplishing fuel admission and compression strokes, a second stage providing expansion and exhaust strokes and having ignition means as well as exhaust means, and a third stage defining blower means which supplies compressed air to the second stage for efficiently scavenging spent gases from said second stage.

A still further object of the invention is to provide an improved rotary internal combustion engine which is relatively compact in size, which is light in weight, which is smooth in operation, which provides efficient utilization of fuel, which runs at a safe temperature and with minimum wear of its moving parts, which causes minimum atmospheric air contamination, and which is relatively inexpensive to manufacture.

A still further object of the invention is to provide an improved rotary internal combustion engine which operates according to the Otto cycle (4 strokes) without requiring the use of valves, camshafts, synchronization gears, chains, connecting rods, or other moving parts such as are employed in present reciprocating piston engines, and wherein a plurality of explosions are produced with each turn of the engine power shaft, thereby providing smooth running of the engine, allowing for the use of a flywheel much smaller than normally employed with engines of the reciprocating piston type, and being automatically compensated for wear.

BRIEF DESCRIPTION OF THE DRAWINGS

Further objects and advantages of the invention will become apparent from the following description and claims, and from the accompanying drawings, wherein:

FIG. 2 is a side elevational view of the engine of FIG. 1.

FIG. 3 is a top plan view of the engine of FIG. 1.

FIG. 4 is an enlarged vertical transverse cross-sectional view taken substantially on line 4—4 of FIG. 2.

FIG. 5 is an enlarged vertical transverse cross-sectional view taken substantially on line 5—5 of FIG. 2.

FIG. 6 is an enlarge vertical transverse cross-sectional view taken substantially on line 6—6 of FIG. 2.

DETAILED DESCRIPTION OF A PREFERRED EMBODIMENT

Figure 1:
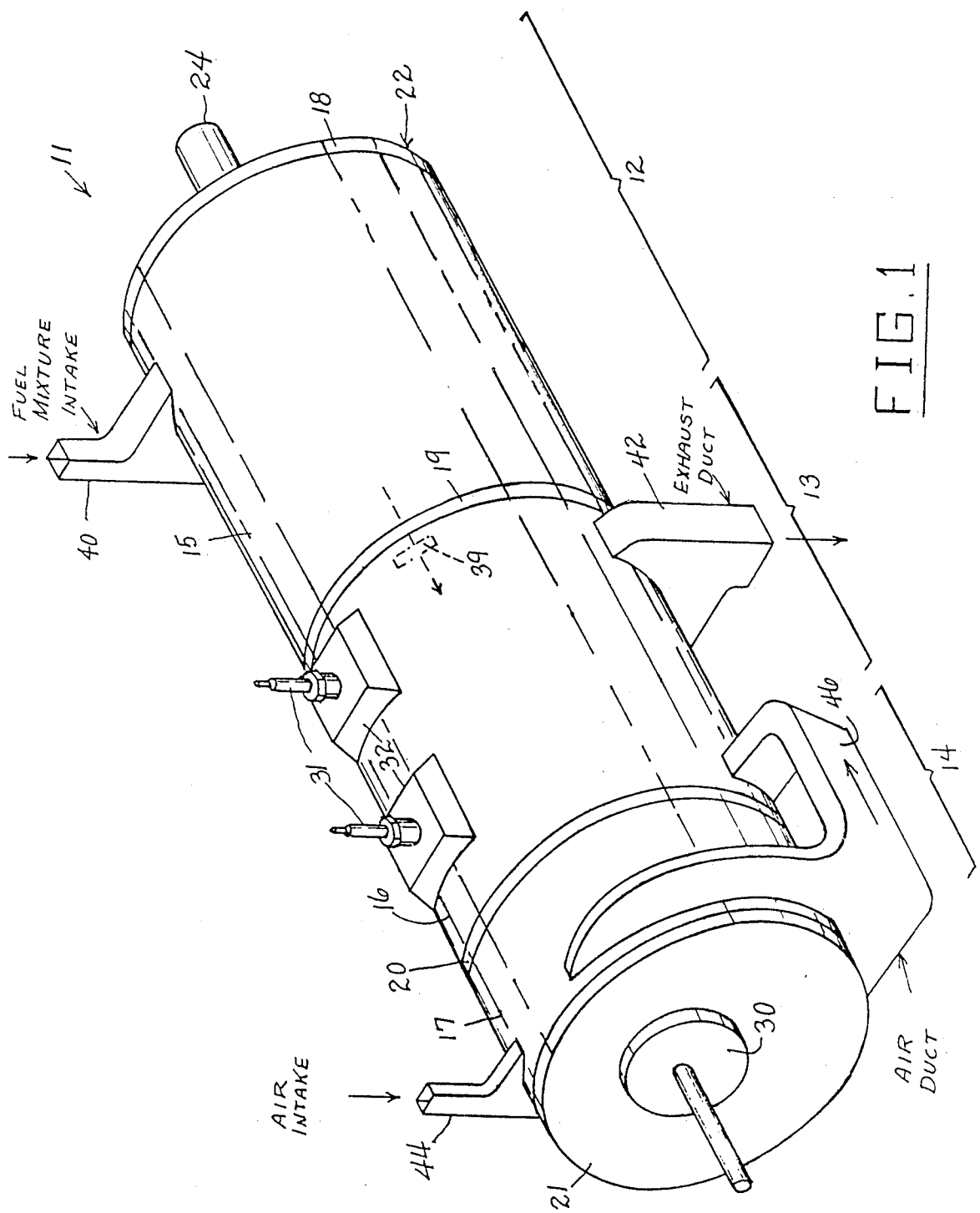
FIG. 1 is a perspective view of a typical improved rotary internal combustion engine constructed in accordance with the present invention, shown removed from its operational mounting.

Referring to the drawings, an improved rotary internal combustion engine according to the present invention is designated generally at 11. The engine 11 comprises three sections, shown generally at 12, 13 and 14, respectively, as shown in FIG. 1. The engine comprises three coaxial cylindrical stators, or housing sections, shown respectively at 15, 16 and 17. A cover disc 18 is provided on the right end of stator 15. A partition wall disc 19 is provided between housing sections 15 and 16. Another partition wall disc 20 is provided between housing sections 16 and 17. A cover disc 21 is provided on the left end of housing section 17, as viewed in FIGS. 1 and 7. The housing parts 18, 15, 19, 16, 17 and 21 are rigidly secured together in any suitable manner, as by welding, by longitudinal tie rods, or by other conventional means, to define a unitary generally cylindrical housing configuration, shown generally at 22.

Eccentrically journalled in the unitary cylindrical housing 22 is a common power shaft 24 having respective shaft sections 25, 26 and 27 in the stators 15, 16 and 17, with respective sealed shaft bearing units 28 provided at the journal apertures of the disc elements 18, 19, 20 and 21. Respective end retaining washers 29 and 30 are provided around the outer ends of shaft 24 and are rigidly and sealingly secured to the respective opposite end walls 18 and 21.

As will be presently described, stator section 15 defines a fuel mixture admission and compression chamber, stator section 16 defines a combustion and exhaust chamber, and stator section 17 defines an air blower chamber for blowing scavenging air to be furnished to chamber 16. The combustion chamber 16 is provided with a pair of longitudinally aligned spaced spark plugs 31, 31 mounted on outwardly extending hollow bosses 32, 32 located substantially at the minimum-radius portion of cylindrical stator 16 with respect to shaft portion 26. Spark plugs 31 are energized by a conventional ignition system, not shown, and are timed to fire six times per rotation of power shaft 24.

Respective cylindrical rotors 33, 34 and 35 are rigidly secured on and are coextensive with shaft sections 25, 26 and 27. The rotors are respectively formed with six evenly angularly spaced, longitudinally aligned, sets of radial grooves, of identical radial length, in which are slidably mounted respective sets of flat vanes 36, 37 and 38 of identical radial length and which are coextensive longitudinally with their respective radial grooves. When shaft 24 is rotated, the vanes are urged outwardly by centrifugal force or by the aid of suitable springs, not shown so as to make sliding sealing contact with the inside surfaces of their associated stators 15, 16 and 17, thereby defining respective working spaces therebetween, as shown in FIGS. 4, 5 and 6. The partition disc 19 is formed near its periphery and near the right end of the top right working space, as viewed in FIG. 5, with a compressed fuel entry port 39 to admit compressed charge of fuel and air from stator section 15 for ignition by spark plugs 31, 31 as the spaces between adjacent vanes 37 rotate counterclockwise.

Figure 7:
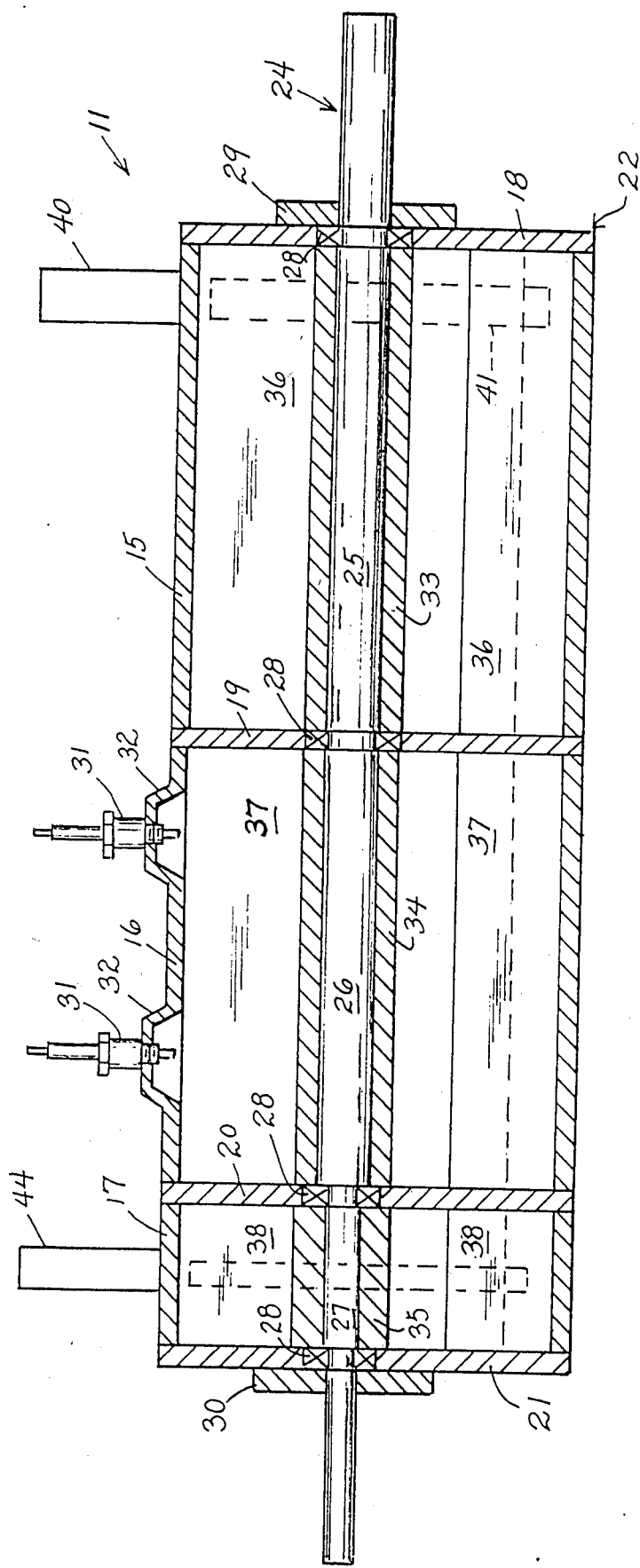
FIG. 7 is an enlarged vertical longitudinal cross-sectional view taken substantially on line 7—7 of FIG. 3.

Communicatively connected to the rightward end portion of admission chamber stator section 15, as viewed in FIGS. 1 and 7, is a fuel mixture intake duct 40, supplied with fuel mixture from a conventional carburetor. As shown in FIG. 4, intake duct 40 is connected to the left side of stator 15 via a large arcuate slot 41 formed in said stator at said left side, which is the right side in FIGS. 1 and 7.

An exhaust duct 42 is communicatively connected to the lower right portion of stator section 16 near its right end portion, as shown in FIG. 1, via an arcuate slot 43, shown in FIG. 5. Exhaust duct 42 is externally connected to a conventional muffler, not shown.

An air intake duct 44 is communicatively connected to the left side of stator section 17, as viewed in FIG. 6, via a large arcuate slot 45, as shown in FIG. 6. A compressed air transfer duct 46 is communicatively connected between the right side of stator section 17, as viewed in FIG. 6 (via a large arcuate slot 47), and the left lower portion of stator 16, as viewed in FIG. 1, to deliver scavenging air under pressure to the exhaust space in stator section 16 after each power stroke.

The four strokes of the Otto cycle, i.e., fuel admission, fuel compression, expansion (fuel ignition) and exhaust, which occur in the same cylinder of a conventional reciprocating-piston type motor, are separated in the engine of the present invention. Admission and compression strokes take place in the section 12 (in stator 15); expansion and exhaust strokes take place in the section 13 (in stator 16); and section 14 (stator 17) is an expeller stage which injects air into the section 13 through the duct 46.

In operation, referring first to FIG. 4, with counterclockwise rotation of power shaft 24, the chamber area 50 adjacent to slot 41 is caused to increase, producing aspiration of the fuel-air intake mixture through the duct 40. In the succeeding area 51 the volume decreases, and the mixture is compressed and is then discharged into section 13 (stator 16) via port 39.

In section 13 (FIG. 5) the compression stroke ends and the confined mixture immediately ahead of port 39 is fired by the spark plugs 31. The expansion stroke occurs in the region 52, where the volume increases.

When the driven vane 37 reaches and passes into the region 53, the exhaust duct port 43 allows the burned gases to escape via exhaust duct 42. This is the first phase of the exhaust stroke. When this vane continues to move on, the large port 47 (FIG. 6) allows air blown in from section 14 to travel through duct 46 into the space 53 of section 13 (stator 16) to exert a scavenging action on the burned gases, to thereby complete their exhaust from zone 53 via the port 43 and duct 42. This is the second phase of the exhaust stroke.

In this way, the above-described engine 11 accomplishes the four strokes of the theoretical Otto cycle.

It is to be noted that the three rotors 33, 34 and 35 have the same orientation, thereby facilitating their fabrication and also facilitating the subsequent assembly of the engine. It will also be noted that since six evenly spaced explosions take place per revolution of power shaft 24, there are six uniformly spaced power strokes per revolution, thereby providing smooth power generation and requiring only a relatively small flywheel to maintain steady torque under load conditions.

Suitable conventional systems, not shown, may be employed to provide engine cooling, firing and lubrication. The scavenging action of the built-in air blower section 14 aids in engine cooling by quickly lowering the temperature of the exhaust gases as they are onducted to the engine muffler. This also reduces corrosion of the muffler system and extends its useful life.

While a specific embodiment of an improved rotary internal combustion engine has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

I claim:

1. A rotary internal combustion engine comprising a housing assembly including three sections and having a single common power shaft, said three sections being integrally connected together and operatively connected together into a unitary self-contained engine, air and fuel mixture intake conduit means communicatively connected to a first of said three sections, means in said first section to perform admission and compression of said air and fuel mixture admitted from said conduit means, means to convey the compressed air and fuel mixture to a second of said three sections; a single internal partition wall means between said first and second sections, and said air and fuel mixture conveying means comprising a port formed in said partition wall means; means in said second section to ignite the compressed air and fuel mixture and to permit expansion of the ignited air and fuel mixture to thereby furnish power strokes to said power shaft; means in said second section for exhausting the gaseous products of combustion, air blower means in the third of said three sections driven by said power shaft, means to convey air blown from said third section to said second section to exert a scavenging action on said products of combustion, and said three sections comprising axially aligned cylindrical chambers with said second section between said first and third sections, and said common power shaft being eccentrically journalled in said chambers and disposed generally axially of said engine.

2. The internal combustion engine of claim 1, and wherein said means to perform admission and compression comprises a rotor mounted on said power shaft and having a plurality of spaced radial vanes slidably and sealingly engageable with the inside surface of said first section.

3. The internal combustion engine of claim 2, and wherein said radial vanes are slidably carried by said rotor and are evenly spaced.

4. The internal combustion engine of claim 1, and wherein said means to ignite the compressed air and fuel mixture comprises sparking means in the second section and a second rotor mounted on the power shaft in said second section and having a plurality of spaced radial vanes slidably and sealingly engageable with the inside surface of said second section.

5. The internal combustion engine of claim 1, and wherein said air blower means comprises air intake duct means on said third section, and a third rotor mounted on said power shaft in said third section and having a plurality of spaced radial vanes slidably and sealingly engageable with the inside surface of said third section.

6. The internal combustion engine of claim 5, and wherein said last-named radial vanes are slidably carried by said third rotor.

7. The internal combustion engine of claim 5, and wherein the respective first, second and third rotors and the vanes provided thereon are in longitudinal alignment with each other and have the same angular orientation.

8. The internal combustion engine of claim 1, and wherein said three sections comprise axially aligned cylindrical chambers and said common power shaft is eccentrically journalled in said chambers, and wherein said means to convey air comprises a transfer duct communicatively connecting an outlet portion of said blower means to a portion of the second section located in the region of said gaseous product exhaust means.

9. The internal combustion engine of claim 8, and wherein said air blower means comprises air intake duct means on said third section, and a third rotor mounted on said power shaft and having a plurality of spaced radial vanes slidably carried thereon and being slidably and sealingly engageable with the inside surface of said third section.

10. The internal combustion engine of claim 9, and wherein said air intake duct means and said transfer duct are located on opposite axial ends of said third section.

11. The internal combustion engine of claim 9, and wherein said third section and second section are in side-by-side relationship, and wherein said transfer duct is connected to said second section.

12. The internal combustion engine of claim 1, wherein said engine defines means for providing six power strokes per revolution of said power shaft.

* * * * *